United States Patent
Krishnamoorthi et al.

(10) Patent No.: US 7,702,712 B2
(45) Date of Patent: Apr. 20, 2010

(54) FFT ARCHITECTURE AND METHOD

(75) Inventors: Raghuraman Krishnamoorthi, San Diego, CA (US); Chinnappa K. Ganapathy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1323 days.

(21) Appl. No.: 11/002,478

(22) Filed: Dec. 1, 2004

(65) Prior Publication Data

US 2005/0182806 A1 Aug. 18, 2005

Related U.S. Application Data

(60) Provisional application No. 60/527,196, filed on Dec. 5, 2003.

(51) Int. Cl.
*G06F 17/14* (2006.01)

(52) U.S. Cl. ..................................... 708/404
(58) Field of Classification Search .................. 708/404
See application file for complete search history.

(56) References Cited

U.S. PATENT DOCUMENTS

| | | | | |
|---|---|---|---|---|
| 6,088,714 | A * | 7/2000 | Wadleigh | 708/404 |
| 6,304,887 | B1 * | 10/2001 | Ju et al. | 708/404 |
| 6,609,140 | B1 * | 8/2003 | Greene | 708/404 |
| 6,839,728 | B2 * | 1/2005 | Pitsianis et al. | 708/404 |
| 7,233,968 | B2 * | 6/2007 | Kang | 708/404 |

FOREIGN PATENT DOCUMENTS

JP 59-189474 10/1984

OTHER PUBLICATIONS

Dawoud, "An EffectiveMemory Addressing Scheme for Multiprocessor FFT System," 2002 IEEE Africon 6th Conference in Africa, University of Pretoria, George, South Africa.
Dawoud contd: Oct. 2-4, 2002, vol. 1 of 2, pp. 29-34.
Steckenbiller et al., "A Transpose-Register for a 2D-FFT of 64×64 Pixel-Blocks," Euro ASIC 1992 Proceedings, Paris, France, Jun. 1-5, 1992, pp. 294-297.
International Search Report—PCT/US04/040498—ISA/EPO—Apr. 10, 2006.
Written Opinion—PCT/US04/040498—ISA/EPO—Apr. 10, 2006.
International Preliminary Report on Patentability—PCT/US04/040498—IPEA/US—Sep. 11, 2006.

* cited by examiner

*Primary Examiner*—David H Malzahn
(74) *Attorney, Agent, or Firm*—Sandip S. Minhas; Gerald P. Joyce, III

(57) ABSTRACT

A Fast Fourier Transform (FFT) hardware implementation and method provides efficient FFT processing while minimizing the die area needed in an Integrated Circuit (IC). The FFT hardware can implement an N point FFT, where $N=r^n$ is a function of a radix (r). The hardware implementation includes a sample memory having N/r rows, each storing r samples. A twiddle factor memory can store k twiddle factors per row, where $0<k<r$ represents the number of complex twiddle multipliers available. An FFT module reads r rows from memory, performs an r-point complex FFT on the samples, followed by twiddle multiplication, and writes the results into an r×r register bank. The contents of the register bank are written in transposed order back to the sample memory. This operation is repeated $N/r^2$ times for each stage and then repeated for n-stages to produce the N point FFT.

31 Claims, 8 Drawing Sheets

$$W(k) = \exp(-j2\pi k/8)$$

FFT ARCHITECTURE AND METHOD

CROSS-REFERENCES TO RELATED APPLICATIONS

This application claims the benefit of U.S. Provisional Application No. 60/527,196, filed Dec. 5, 2003, and entitled NOVEL ARCHITECTURE FOR IMPLEMENTING HIGH-SPEED FFTS IN HARDWARE, which is hereby incorporated herein in its entirety.

FIELD

The disclosure relates to the field of signal processing. In particular, the disclosure relates to apparatus and methods for implementing a Fast Fourier Transform (FFT).

BACKGROUND

The Fourier Transform can be used to map a time domain signal to its frequency domain counterpart. Conversely, an Inverse Fourier Transform can be used to map a frequency domain signal to its time domain counterpart. Fourier transforms are particularly useful for spectral analysis of time domain signals. Additionally, communication systems, such as those implementing Orthogonal Frequency Division Multiplexing (OFDM) can use the properties of Fourier transforms to generate multiple time domain symbols from linearly spaced tones and to recover the frequencies from the symbols.

A sampled data system can implement a Discrete Fourier Transform (DFT) to allow a processor to perform the transform on a predetermined number of samples. However, the DFT is computationally intensive and requires a tremendous amount of processing power to perform. The number of computations required to perform an N point DFT is on the order of $N^2$, denoted $O(N^2)$. In many systems, the amount of processing power dedicated to performing a DFT may reduce the amount of processing available for other system operations. Additionally, systems that are configured to operate as real time systems may not have sufficient processing power to perform a DFT of the desired size within a time allocated for the computation.

The Fast Fourier Transform (FFT) is a discrete implementation of the Fourier transform that allows a Fourier transform to be performed in significantly fewer operations compared to the DFT implementation. Depending on the particular implementation, the number of computations required to perform an FFT of radix r is typically on the order of $N \times \log_r(N)$, denoted as $O(N\log_r(N))$.

In the past, systems implementing an FFT may have used a general purpose processor or stand alone Digital Signal Processor (DSP) to perform the FFT. However, systems are increasingly incorporating Application Specific Integrated Circuits (ASIC) specifically designed to implement the majority of the functionality required of a device. Implementing system functionality within an ASIC minimizes the chip count and glue logic required to interface multiple integrated circuits. The reduced chip count typically allows for a smaller physical footprint for devices without sacrificing any of the functionality.

The amount of area within an ASIC die is limited, and functional blocks that are implemented within an ASIC need to be size, speed, and power optimized to improve the functionality of the overall ASIC design. The amount of resources dedicated to the FFT should be minimized to limit the percentage of available resources dedicated to the FFT. Yet sufficient resources need to be dedicated to the FFT to ensure that the transform may be performed with a speed sufficient to support system requirements. Additionally, the amount of power consumed by the FFT module needs to be minimized to minimize the power supply requirements and associated heat dissipation. Therefore, it may be desirable to optimize an FFT architecture for implementation within an integrated circuit, such as an ASIC.

SUMMARY

An FFT hardware implementation and method provides efficient FFT processing while minimizing the die area needed in an Integrated Circuit (IC). The FFT hardware can be used to implement an N point FFT, where $N=r^n$ is a function of a radix (r). The hardware implementation includes a sample memory having N/r rows, each storing r samples. A memory used to store twiddle factors has k twiddle factors per row, where $0<k<r$ represents the number of complex twiddle multipliers available. An FFT module, reads r rows from memory (with the row address being a function of the stage of the FFT), performs an in place r-point complex FFT on the samples of each row followed by twiddle multiplication (except for the last stage) and writes the results into an r×r sized matrix memory (register bank). The contents of the r×r sized matrix memory are written, in transposed order or optionally without transposition, back to the sample memory. This operation is repeated $N/r^2$ times for each stage and then repeated for n-stages to produce the N point FFT.

In one aspect, a method of determining an $r^n$-point, radix r, FFT is disclosed. The method includes writing samples to be transformed into a memory having r samples per row, reading r rows from the memory, determining r radix r partial FFTs to generate $r^2$ partial FFT values, applying twiddle factors to the $r^2$ partial FFT values to generate $r^2$ weighted partial FFT values, writing the $r^2$ weighted partial FFT values to a register block, transposing the $r^2$ weighted partial FFT values in the register block to generate transposed values, writing the transposed values to the memory, and determining FFT values from the contents of memory.

In another aspect, a method of determining an $r^n$-point, radix r, FFT is disclosed. The method includes writing samples to be transformed into a memory having r samples per row, initializing a stage value, initializing a block value, processing an FFT stage, repeating processing the FFT stage n times, and determining FFT values from the contents of memory. Processing the FFT stage includes a) determining a number of blocks based on the stage value, b) retrieving r rows from the memory, c) determining r radix r partial FFTs to generate $r^2$ partial FFT values, d) applying twiddle factors to the $r^2$ partial FFT values to generate $r^2$ weighted partial FFT values, e) transposing the $r^2$ weighted partial FFT values in the register block to generate transposed values, f) writing the transposed values to the memory, g) repeating steps b) through f) based on the block and stage values, and incrementing the stage value.

In yet another aspect, a method of determining an $r^n$-point, radix r, FFT. The method includes writing samples to be transformed into a memory having r samples per row, a) initializing a stage counter, b) initializing a block counter and a partial FFT output counter, c) retrieving r rows from the memory based on the stage, block and partial FFT counter values, d) determining r radix r partial FFTs to generate $r^2$ partial FFT values, e) applying twiddle factors to the $r^2$ partial FFT values to generate $r^2$ weighted partial FFT values, f) writing the $r^2$ weighted partial FFT values to a register block, g) transposing the $r^2$ weighted partial FFT values in the register block to generate transposed values, i) writing the transposed values to the memory, j) updating the partial FFT counter and block counter, k) repeating steps c) through j) based on the value of the block counter and the partial FFT counter, l) updating the value of the stage counter, m) repeating steps b) through k) based on the value of the stage counter, and determining FFT values from the contents of memory.

In another aspect, an $r^n$-point, radix r, FFT apparatus is disclosed. The apparatus includes a memory configured to store $r^n$ samples with r samples per memory row, an FFT engine configured to perform r r-point partial FFT on samples from r rows of the memory, a register bank having $r^2$ registers configured as r rows of r columns, and configured to receive output values from the FFT engine, and a transposition module configured to transpose the values in the register bank and write transposed values to the r rows from memory operated on by the FFT engine.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION

Figure 1:
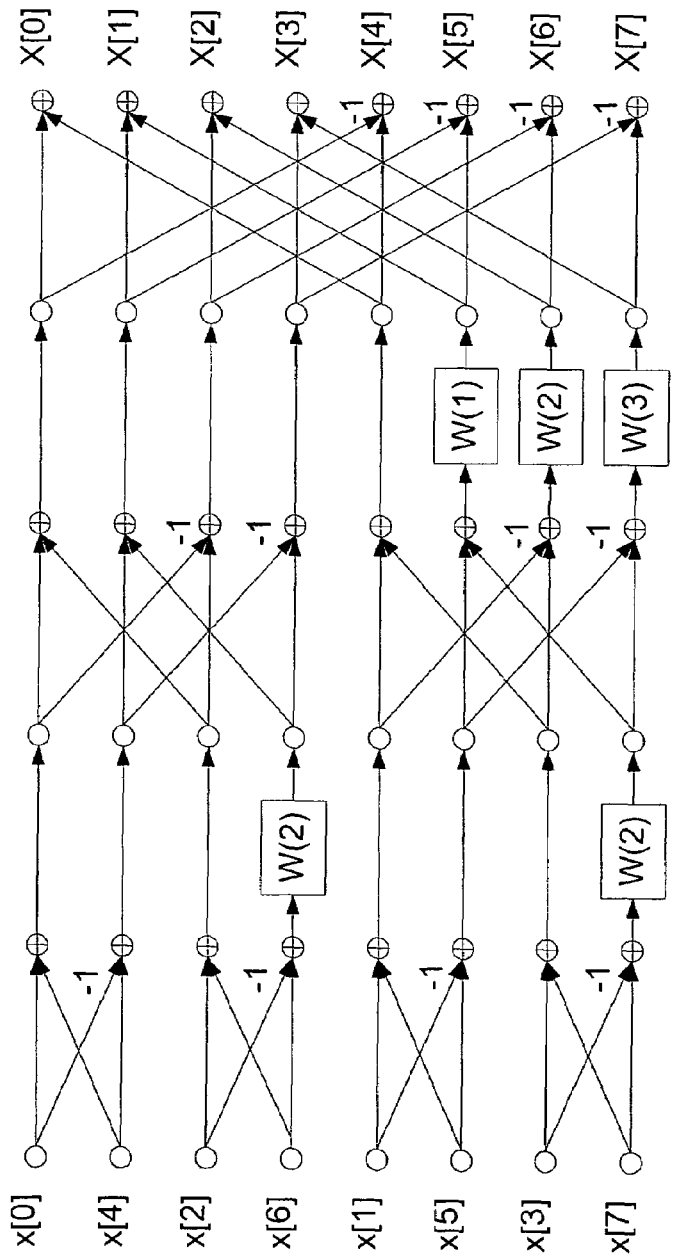
FIG. 1 is a flow graph of an 8 point radix 2 FFT.

A hardware architecture suitable for an FFT or Inverse FFT (IFFT), a device incorporating an FFT module, and a method of performing an FFT or IFFT are disclosed. The FFT architecture is generalized to allow for the implementation of an FFT of any radix. The FFT architecture allows the number of cycles used to perform the FFT to be minimized while maintaining a small chip area. In particular, the FFT architecture configures memory and register space to optimize the number of memory accesses performed during an in place FFT. The FFT architecture provides additional flexibility in its implementation and allows for variations of radix and number of complex multipliers, depending on the particular design constraints. In implementations that are speed sensitive, but are less sensitive to die area, the FFT architecture can be implemented with additional complex multipliers and higher radix. In implementations that are more sensitive to die area, the radix can be reduced and the number of complex multipliers reduced.

The FFT architecture includes a sample memory that is configured to have a memory row width that is sufficient to store a number of samples equal to the FFT radix. Thus, the sample memory is configured to have N/r rows of r samples per row, where N represents the size of the FFT and r represents the FFT radix. An FFT block is configured to retrieve rows from the memory and perform an r-point FFT on the samples in each row. The FFT block retrieves a number of rows equal to the FFT radix, but performs the r-point FFT on the samples from each individual row.

The FFT block writes the results of the r-point FFTs to a register bank that is configured to store $r^2$ samples. Complex multipliers coupled to the register bank and to a twiddle factor memory weight the FFT results with the appropriate twiddle factors. The weighted factors are returned to the same registers.

The contents of the register bank are transposed before being rewritten to the original rows in the sample memory. The transposition of the values in the register bank allows the FFT to be performed in place by maintaining the relationship of FFT samples in the same row of sample memory. The samples in the sample memory are retrieved, processed, and returned to the sample memory for a number of stages sufficient to perform the N-point FFT.

It is of interest to first examine the arithmetic complexity of various FFT algorithms before proceeding with a discussion of the hardware based trade-offs in the disclosed architecture. Cooley-Tukey algorithms of radix 2, 4, 8, 16 and a split radix algorithm are examined. Prime factor based algorithms are not considered because they do not have a regular structure and are more sensitive to quantization, even though the complexity of these algorithms may be lower than Cooley-Tukey based algorithms.

The complexity of the algorithms is evaluated here based on the number of actual real multiplications and additions required. A complex multiplication is assumed to be equal to four real multiplications and two real additions.

The number of real multiplies and additions required by radix-r algorithms can be determined by noting that these algorithms split the computation of an $r^n$ point DFT into the computation of r, $r^{n-1}$-point DFTs at the cost of $(r^{n-1}-1).(r-1)$ twiddle multiplies and further processing by $r^{n-1}$ r-point FFTs. FIG. 1 is an example of signal flow of an 8-point radix 2 FFT demonstrating this structure.

Denoting the number of real multiplies required for an $r^n$ point FFT by $M_n^r$ and the number of real additions required by $A_n^r$, the processing complexity is defined by the recursions:

$$M_n^r = r.M_{n-1}^r + (r^{n-1}-1).(r-1).4 + r^{n-1}.M_1^r$$

$$A_n^r = r.A_{n-1}^r + (r^{n-1}-1).(r-1).2 + r^{n-1}.A_1^r$$

with the initial conditions:

$$M_1^4 = 0, M_1^8 = 4, M_1^{16} = 24$$

$$M_1^2 = M_2^2 = 0, M_3^2 = 4$$

$$A_1^2 = 4, A_1^4 = 16, A_1^8 = 52, A_1^{16} = 144$$

The complexity of the split radix algorithm is evaluated in a similar manner. The split radix algorithm splits an N-point FFT into one FFT of size N/2 and two FFTs of size N/4 at the cost of some twiddle multiplies. The complexity of the algorithm is defined by the recursion:

$$M_n^s = M_{n-1}^s + 2M_{n-2}^s + (2^{n-1}-4) \cdot 4 + 4$$

$$A_n^s = \frac{M_n^s}{2} + n \cdot 2^{n+1}$$

$$M_1^s = M_2^s = 0$$

Based on these recursions, the complexity of several common FFT algorithms can be tabulated and compared. Tables 1 and 2 compile the complexity results for the common FFT algorithms. The table includes empty cells for those configurations that were not evaluated.

TABLE 1

Real multiplications for different FFT algorithms

| FFT size | Radix 2 | Radix-4 | Radix-8 | Radix-16 | Split radix |
|---|---|---|---|---|---|
| 64 | 452 | 324 | 260 | | 248 |
| 128 | 1156 | | | | 660 |
| 256 | 2820 | 2052 | | 1668 | 1656 |
| 512 | 6660 | | 4100 | | 3988 |
| 1024 | 15364 | 11268 | | | 9336 |
| 2048 | 34820 | | | | 21396 |
| 4096 | 77828 | 57348 | 49156 | 48132 | 48248 |
| 8192 | 172036 | | | | 107412 |

TABLE 2

Real additions for different FFT algorithms

| FFT size | Radix 2 | Radix-4 | Radix-8 | Radix-16 | Split radix |
|---|---|---|---|---|---|
| 64 | 994 | 930 | 930 | | 892 |
| 128 | 2370 | | | | 2122 |
| 256 | 5506 | 5122 | | 5058 | 4924 |
| 512 | 12546 | | 11650 | | 11210 |
| 1024 | 28162 | 26114 | | | 25148 |
| 2048 | 62466 | | | | 55754 |
| 4096 | 137218 | 126978 | 126978 | 125442 | 122428 |
| 8192 | 299010 | | | | 107412 |

The arithmetic complexity in tables 1 and 2 does not give a complete picture of the hardware cost of implementing FFT in different algorithms. The cost of accessing data and twiddle factors from memory and writing data into memory needs to be considered. The table below shows the number of memory accesses (only data accesses are counted) required by different algorithms for different radix sizes. The number of data accesses is obtained by noting that for a radix r implementation of an N-point FFT/IFFT, the total number of stages is $\log_r(N)$ and each stage requires 2N read and write operations, leading to $2N \log_r(N)$ memory complex sample access operations.

TABLE 3

Memory accesses for different FFT algorithms

| FFT size | Radix 2/ Split Radix | Radix-4 | Radix-8 | Radix-16 |
|---|---|---|---|---|
| 64 | 768 | 384 | 256 | |
| 128 | 1792 | | | |
| 256 | 4096 | 2048 | | 1024 |
| 512 | 9216 | | 3072 | |
| 1024 | 20480 | 10240 | | |
| 2048 | 45056 | | | |
| 4096 | 98304 | 49152 | 32768 | 24576 |
| 8192 | 212992 | | | |

An analysis of FFT implementation in hardware shows that the dominant cost in terms of cycles used is spent in memory accesses. The number of memory accesses reduces with increasing radix. However, accessing one complex sample/cycle may not be sufficient for many applications. A simple example illustrates a potential problem.

Consider the problem of implementing a 64-point FFT for an Orthogonal Frequency Division Multiplex (OFDM) system having a symbol duration of 4 µs and a clock rate of 40 MHz. Such a system may be, for example, an IEEE 802.11 a system with a clock of 40 MHz. The OFDM symbol duration of 4 µs in combination with the 40 MHz clock rate translates into 160 cycles available between symbols.

The cost of implementing a 64 point FFT by using radix-2 algorithms is first examined. The total number of memory accesses required is 768, as shown in the table above. Therefore, implementing a radix-2 algorithm using memory with only one sample read or write per cycle would cost a minimum of 768 cycles, which is about 5 times the number of cycles available for computation. Split radix-algorithms suffer from the same problem of requiring comparable amounts of memory access as radix-2 algorithms.

However, for a 64 point FFT using a radix-4 algorithm, the number of memory accesses required is 384. This is better but still much higher than the number of available cycles. Further increases in the radix of the FFT algorithm, further reduce the amount of memory access required, as the number of stages in the FFT falls.

A high-speed implementation for any radix algorithm can be achieved through the use of a memory structure that enables parallel read and write. For a particular radix-r algorithm, a memory structure that allows access, whether for a read or a write operation, of r-values in one cycle improves the throughput of the algorithm. Conceptually, parallel access can be thought of as a RAM having r words in each row. However, to obtain the maximum benefit from this memory structure, the r-samples required for computing an r-point FFT need to be in the same row at every stage of the algorithm. This can be achieved by reading r rows of sample memory, computing r, r-point FFTs and writing the results after transposition into sample memory. The transposition operation can be performed in a matrix memory of $r^2$ registers. As the radix r increases, the size of the FFT engine and the size of the matrix memory increase. The trade-off of area to speed can be performed for any particular implementation.

Figure 2:
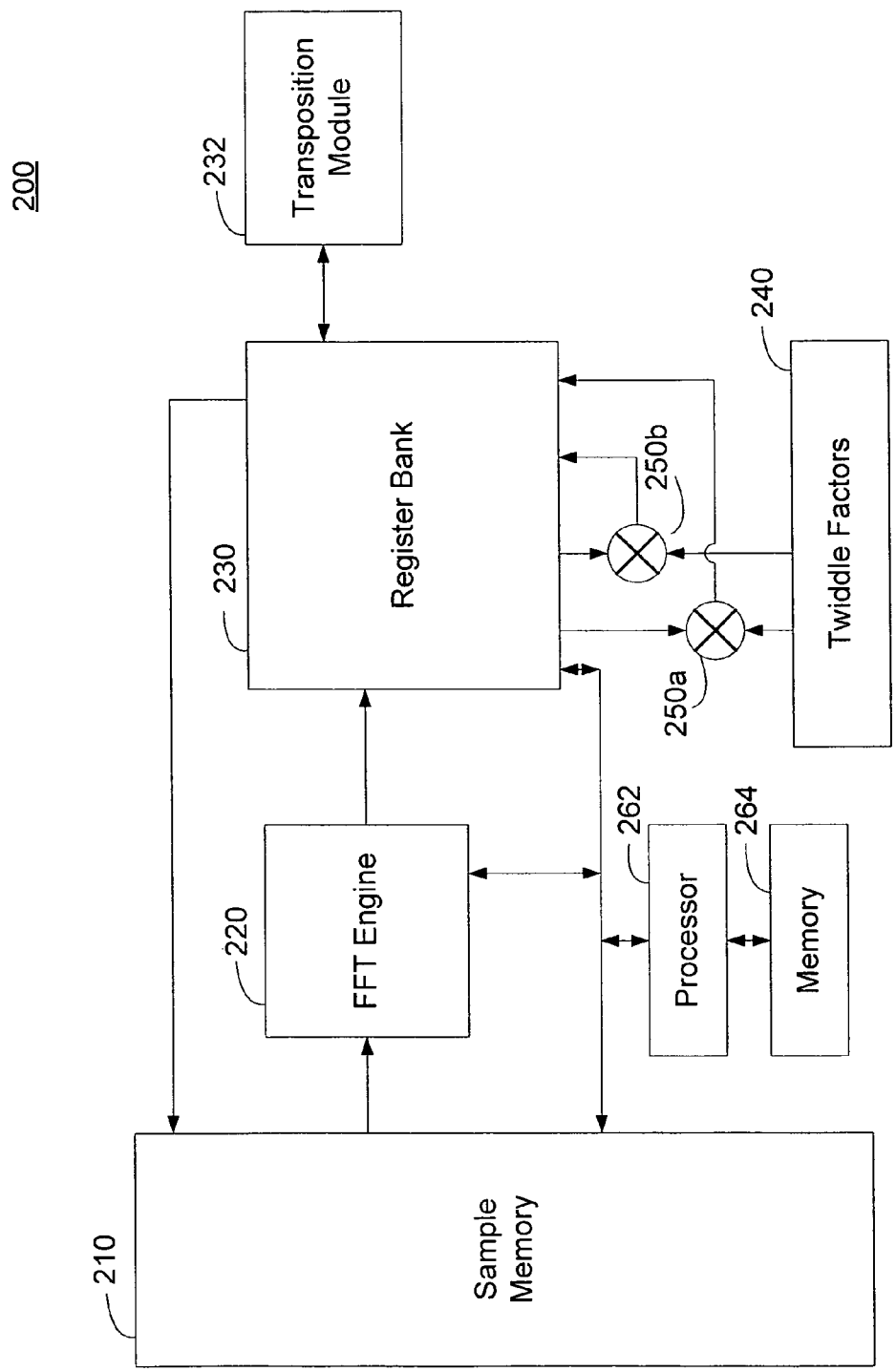
FIG. 2 is a functional block diagram of an embodiment of an FFT module.

FIG. 2 is a functional block diagram of an embodiment of an FFT module 200. The FFT module 200 may be configured as an IFFT module with only small changes, due to the symmetry between the forward and inverse transforms. The FFT module 200 may be implemented on a single IC die, and may be implemented as part of an ASIC. Alternatively, the FFT module 200 may be implemented as multiple elements that are in communication with one another. Additionally, the FFT module 200 is not limited to a particular FFT structure. For example, the FFT module 200 can be configured to perform a decimation in time or a decimation in frequency FFT.

The FFT module 200 includes a memory 210 that is configured to store the samples to be transformed. Additionally, because the FFT module 200 is configured to perform an in-place computation of the transform, the memory 210 is used to store the results of each stage of the FFT and the output of the FFT module 200.

The memory 210 can be sized based in part on the size of the FFT and the radix of the FFT. For an N point FFT of radix r, where $N=r^n$, the memory 210 can be sized to store the N samples in $r^{n-1}$ rows, with r samples per row. The memory 210 can be configured to have a width that is equal to the number of bits per sample multiplied by the number of samples per row. The memory 210 is typically configured to store samples as real and imaginary components. Thus, for a radix 2 FFT, the memory 210 is configured to store two samples per row, and may store the samples as the real part of the first sample, the imaginary part of the first sample, the real part of the second sample, and the imaginary part of the second sample. If each component of a sample is configured as 10 bits, the memory 210 uses 40 bits per row. The memory 210 can be Random Access Memory (RAM) of sufficient speed to support the operation of the module.

The memory 210 is coupled to an FFT engine 220 that is configured to perform an r-point FFT. The FFT module 200 can be configured to perform an FFT similar to the structure shown in FIG. 1, where the weighting by the twiddle factors is performed after the partial FFT, also referred to as an FFT butterfly. Such a configuration allows the FFT engine 220 to be configured using a minimal number of multipliers, thus minimizing the size and complexity of the FFT engine 220. The FFT engine 220 can be configured to retrieve a row from the memory 210 and perform an FFT on the samples in the row. Thus, the FFT engine 220 can retrieve all of the samples for an r-point FFT in a single cycle. The FFT engine 220 can be, for example, a pipelined FFT engine and may be capable of manipulating the values in the rows on different phases of a clock.

The output of the FFT engine 220 is coupled to a register bank 230. The register bank 230 is configured to store a number of values based on the radix of the FFT. In one embodiment, the register bank 230 can be configured to store $r^2$ values. As was the case with the samples, the values stored in the register bank are typically complex values having a real and imaginary component.

The register bank 230 is used as temporary storage, but is configured for fast access and provides a dedicated location for storage that does not need to be accessed through an address bus. For example, each bit of a register in the register bank 230 can be implemented with a flip-flop. As a consequence, a register uses much more die area compared to a memory location of comparable size. Because there is effectively no cycle cost to accessing register space, a particular FFT module 200 implementation can trade off speed for die area by manipulating the size of the register bank 230 and memory 210.

The register bank 230 can advantageously be sized to store $r^2$ values such that a transposition of the values can be performed directly, for example, by writing values in by rows and reading values out by columns, or vice versa. The value transposition is used to maintain the row alignment of FFT values in the memory 210 for all stages of the FFT.

A second memory 240 is configured to store the twiddle factors that are used to weight the outputs of the FFT engine 220. In some embodiments, the FFT engine 220 can be configured to use the twiddle factors directly during the calculation of the partial FFT outputs (FFT butterflies). The twiddle factors can be predetermined for any FFT. Therefore, the second memory 240 can be implemented as Read Only Memory (ROM), non-volatile memory, non-volatile RAM, or flash programmable memory, although the second memory 240 may also be configured as RAM or some other type of memory. The second memory 240 can be sized to store N×(n−1) complex twiddle factors for an N point FFT, where $N=r^n$. Some of the twiddle factors such as 1, −1, j or −j, may be omitted from the second memory 240. Additionally, duplicates of the same value may also be omitted from the second memory 240. Therefore, the number of twiddle factors in the second memory 240 may be less than N×(n−1). An efficient implementation can take advantage of the fact that the twiddle factors for all of the stages of an FFT are subsets of the twiddle factors used in the first stage or the final stage of an FFT, depending on whether the FFT implements a decimation in frequency or decimation in time algorithm.

Complex multipliers 250a-250b are coupled to the register bank and the second memory 240. The complex multipliers 250a-250b are configured to weight the outputs of the FFT engine 220, which are stored in the register bank 230, with the appropriate twiddle factor from the second memory 240. The embodiment shown in FIG. 2 includes two complex multipliers 250a and 250b, However, the number of complex multipliers, for example 250a, that are included in the FFT module 200 can be selected based on a trade off of speed to die area.

A greater number of complex multipliers can be implemented on a die in order to speed execution of the FFT. However, the increased speed comes at the cost of die area. Where die area is critical, the number of complex multipliers may be reduced. Typically, a design would not include greater than r−1 complex multipliers when an r point FFT engine 220 is implemented, because r−1 complex multipliers are sufficient to apply all non-trivial twiddle factors to the outputs of the FFT engine 220 in parallel. As an example, an FFT module 200 configured to perform an 8-point radix 2 FFT, such as that shown in FIG. 1, can implement 2 complex multipliers, but may implement only 1 complex multiplier.

Each complex multiplier, for example 250a, operates on a single value from the register bank 230 and corresponding twiddle factor stored in second memory 240 during each multiplication operation. If there are fewer complex multipliers than there are complex multiplications to be performed, a complex multiplier will perform the operation on multiple FFT values from the register bank 230.

The output of the complex multiplier, for example 250a, is written to the register bank 230, typically to the same position that provided the input to the complex multiplier. Therefore, after the complex multiplications, the contents of the register bank represent the FFT stage output that is the same regardless if the complex multipliers were implemented within the FFT engine 220 or associated with the register bank 230 as shown in FIG. 2.

A transposition module 232 coupled to the register bank 230 performs a transposition on the contents of the register bank 230. The transposition module 232 can transpose the register contents by rearranging the register values. Alternatively, the transposition module 232 can transpose the contents of the register block 230 as the contents are read from the register block 230. The contents of the register bank 230 are transposed before being written back into the memory 210 at the rows that supplied the inputs to the FFT engine 220. Transposing the register bank 230 values maintains the row structure for FFT inputs across all stages of the FFT.

A processor 262 in combination with instruction memory 264 can be configured to perform the data flow between modules, and can be configured to perform some or all of one or more of the blocks of FIG. 2. For example, the instruction memory 264 can store one or more processor usable instructions as software that directs the processor 262 to manipulate the data in the FFT module 200.

The processor 262 and instruction memory 264 can be implemented as part of the FFT module 200 or may be external to the FFT module 200. Alternatively, the processor 262 may be external to the FFT module 200 but the instruction memory 264 can be internal to the FFT module 200 and can be, for example, common with the memory 210 used for the samples, or the second memory 240 in which the twiddle factors are stored.

The embodiment shown in FIG. 2 features a tradeoff between speed and area as the radix of the algorithm changes. For implementing a $N=r^v$ point FFT, the number of cycles required can be estimated as:

$$N_{cycles} \approx \left(\frac{N}{r^2} \cdot v\right) \cdot r \cdot N_{FFT}$$

where, $$\frac{N}{r^2} \cdot v = \text{Number of } r,$$

radix-r FFTs to be computed $rN_{FFT}=r \times$ Time taken to perform one read, FFT, twiddle multiply and write for a vector of r elements.

$N_{FFT}$ is assumed to be constant independent of the radix. The cycle count decreases on the order of $1/r$ ($O(1/r)$). The area required for implementation increases $O(r^2)$ as the number of registers required for transposition increase as $r^2$. The number of registers and the area required to implement registers dominates the area for large N.

The minimum radix that provides the desired speed can be chosen to implement the FFT for different cases of interest. Minimizing the radix, provided the speed of the module is sufficient, minimizes the die area used to implement the module.

FIGS. 3A-3D are flowcharts of embodiment of an FFT process 300. The process 300 can be performed, for example, by the FFT module 200 of FIG. 2. Alternatively, the process 300 can be implemented as one or more processor usable instructions and executed by a processor in conjunction with memory. In other embodiments, portions of the process 300 can be performed in hardware and other portions performed from software.

The process 300 begins at block 302 where FFT module, using for example a processor, writes the data to be transformed into memory having a width that is sufficient to store at least a number of samples equal to the FFT radix. For example, if the FFT module is configured to perform an 8-point radix 2 FFT, as shown in FIG. 1, the memory is configured as 4 rows of two columns and each column can be configured to store two complex samples. The processor can, for example, write the samples into the memory column wise starting with the first column and continuing into the second column as the first column is filled.

Once the sample data is written into the memory, the FFT module proceeds to block 304 where the processor initializes a stage counter. As described above and shown in FIG. 1, an $N=r^n$ point FFT includes n stages. At the start of an FFT, the processor can initialize the stage counter to one. After initializing the stage counter, the FFT module proceeds to block 310 and the processor initializes partial FFT and block counters. The partial FFT and block counters can be, for example, initialized to zero.

As shown in the example of FIG. 1, the number of partial FFTs performed in each stage of the FFT remains constant, but a counter tracking the index of the samples involved in each FFT calculation changes depending on the stage.

After initializing the partial FFT and block counters, the FFT module proceeds to block 312 where the processor initializes an row address pointer. The row address pointer determines the row of memory that is operated on by the FFT engine. For example, the processor can determine the value of the row address pointer as:

$$p_{row}=c_k \cdot r^{n-k}+f_k.$$

The FFT module proceeds to block 314 and reads rows from the sample memory based on the value of the row address pointer. For example, the processor can read the rows from the sample memory and write them to locations in the FFT engine. The processor can read rows determined by the address pointer:

$$a_i=p_{row}+i \cdot r^{n-k-1}, i=0 \ldots (r-1)$$

where n represents the total number of stages and k represents the stage counter.

Once the rows have been read into the FFT engine, the FFT module proceeds to block 320 and computes the r-point FFTs on the retrieved samples. The number of r-point FFTs performed by the FFT engine in the embodiment is equal to the number of rows read from memory, and equals the radix, r. The output of the FFT engine is written into an r×r register bank.

The FFT module proceeds to block 322 and applies the twiddle factors stored in a twiddle factor memory to the FFT output values to weight the values with the twiddle factors. The twiddle factors can be applied using one or more multipliers, and the multipliers can be configured as complex multipliers. After weighting with the twiddle factors, the multipliers write the results back into the r×r register bank in step 324.

The FFT module then proceeds to step 330 and transposes the order of the values in the register bank. In one embodiment, the processor can transpose the order of the values stored in the register bank. In another embodiment, the transposition can occur when values are read from the register bank. For example, the output of the multipliers can be written in to the register bank in a row order and read from the register bank in a column order, resulting in a transposition with relatively little processing.

Figure 3A:
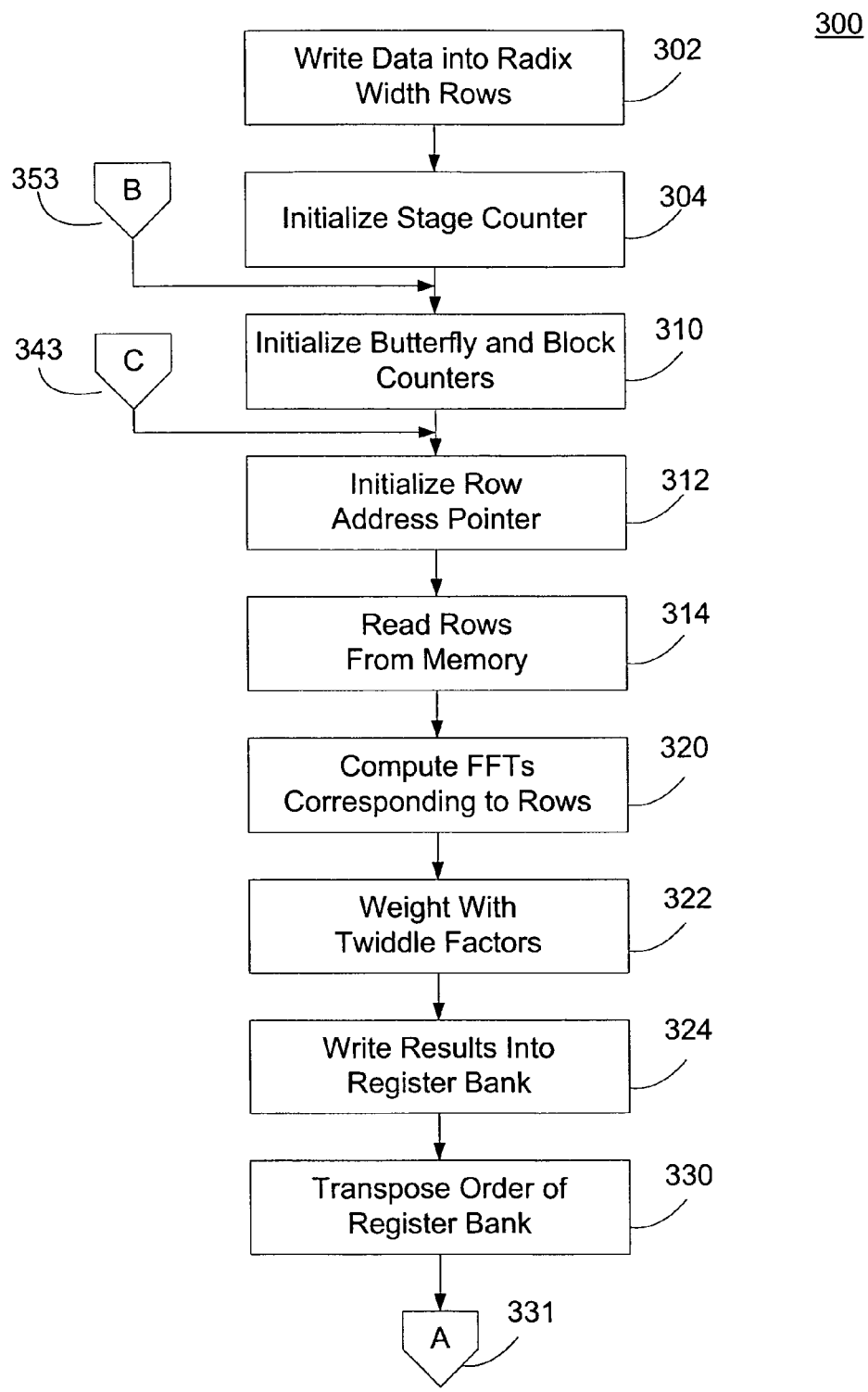
FIGS. 3A-3D are flowcharts of embodiments of an FFT process.
Figure 3B:
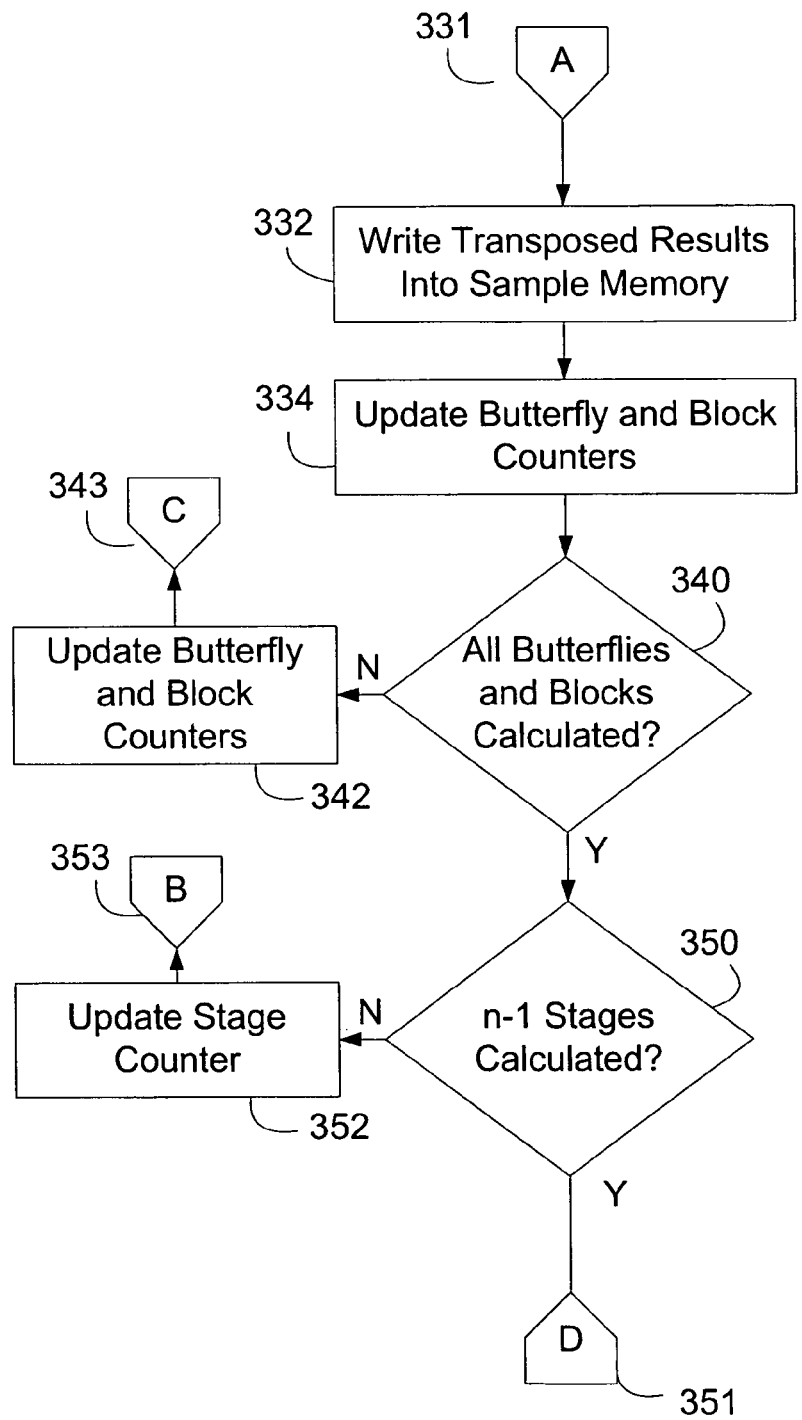

Connector A 331 shown in FIGS. 3A and 3B is used to connect the portions of the flowchart shown in the two figure pages and does not form a substantive part of the process 300. The FFT module proceeds to step 332, via connector A 331, and writes the transposed results from the register bank into the sample memory. The transposed results from the register bank are written into the rows identified by the address pointer determined in block 314. If the transposition is performed through column to row conversion, the FFT module, using the processor, can read the columns of the register bank and write the results in rows to the address identified by the address pointer.

The FFT module proceeds to block 334 and updates the partial FFT and block counters. As discussed earlier, each stage of the FFT is performed as one or more blocks of radix r partial FFTs. In step 334, the FFT module updates the partial FFT and block counters. The processor can update, for example, a partial FFT counter $f_k=(f_k+1) \bmod(r^{n-k-1})$ and if the partial FFT counter is zero, incrementing the block counter.

The FFT module proceeds to decision block 340 and determines if all of the partial FFTs and blocks have been calculated. Not all of the partial FFTs have been determined if the block counter is less than the number of blocks in the stage, $c_k < r^{n-1}$. If not all partial FFTs and blocks have been calculated, the FFT module proceeds to block 342 to update the partial FFT and block counters to process additional partial FFTs. The FFT module then loops back, via connector C 343 to block 310 to continue processing partial FFTs for the present or next FFT block. Connector C 343 is not a substantive part of the process 300, but instead, is used to connect the flowchart across pages.

If the FFT module at decision block 340 determines that all blocks of the current stage have been calculated, the FFT module proceeds to decision block 350 to determine if n−1 stages have been processed. If not, the FFT module proceeds to block 352 to update the stage counter and returns, via connector B 353, to block 310. Connector B 353 is not a substantive part of the process 300, but instead, is used to connect the flowchart across pages.

Figure 3C:
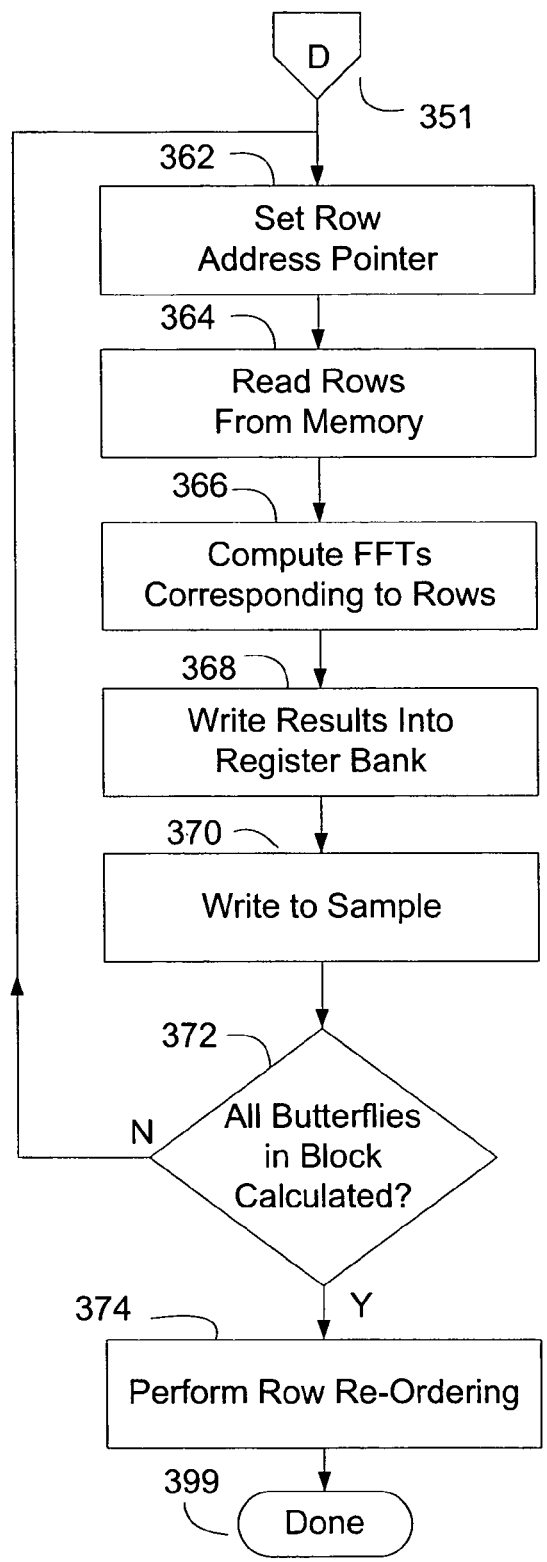
Figure 3D:
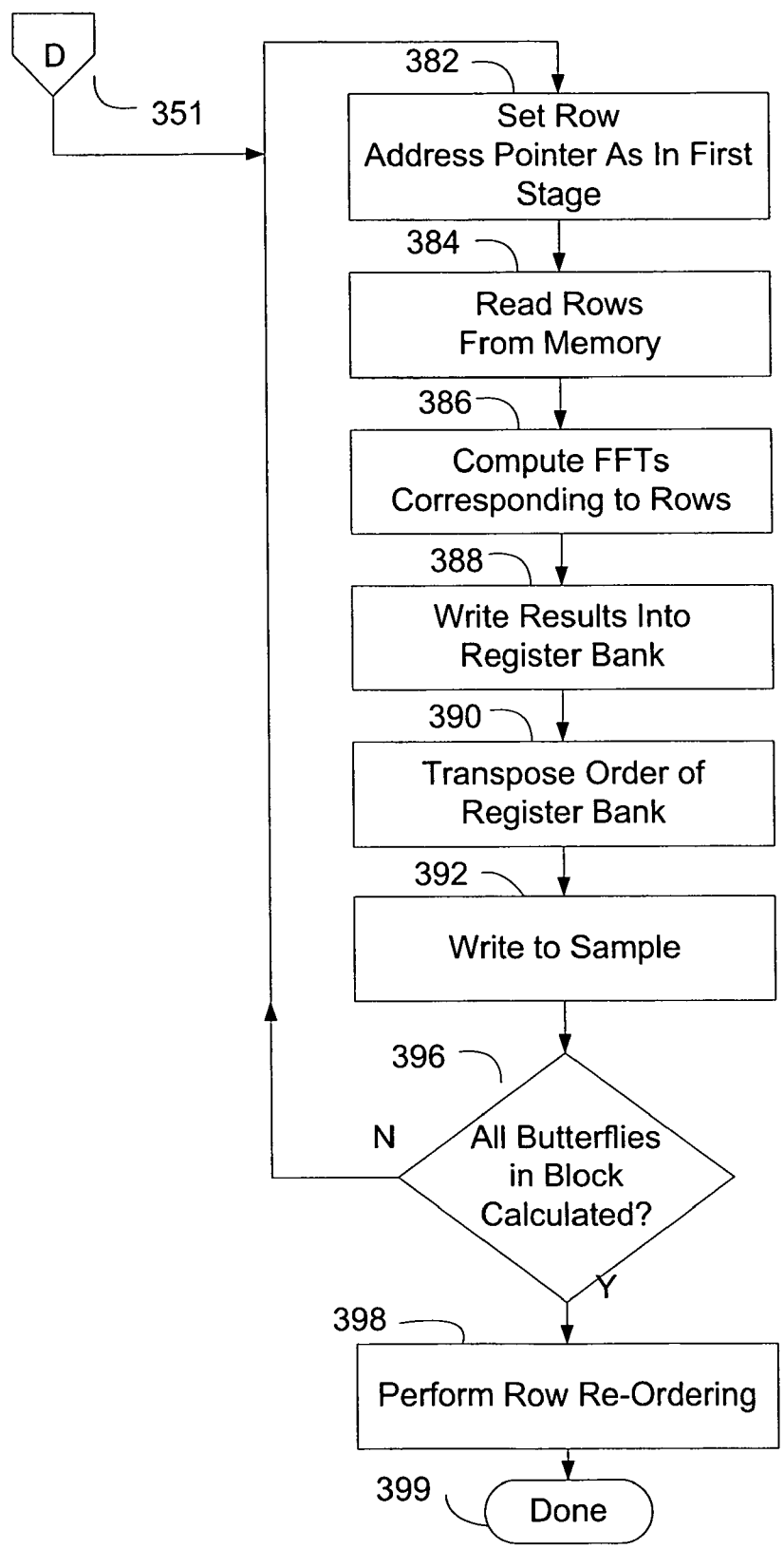

If, at decision block 350, the FFT module determines that n−1 stages have been processed, the FFT module proceeds to process the final stage of the FFT via connector D 351. The FFT module may implement the final stage of the FFT in different embodiments. FIG. 3C illustrates one embodiment in which the FFT module may implement the final FFT stage. FIG. 3D illustrates an alternative embodiment for implementing the final stage of the FFT. Thus, the FFT module can proceed from connector D 351 on FIG. 3B to connector D 351 on FIG. 3C or 3D, but not both, because FIGS. 3C and 3D illustrate alternative embodiments of the same final FFT stage.

In one embodiment, the FFT module can implement the final FFT stage process shown in FIG. 3C. In the final stage process illustrated in FIG. 3C, the FFT module fetches the rows consecutively, but does not perform any transposition following the partial FFTs. The result is an FFT result has samples in each row separated as in the initial FFT stage, but with rows that are in radix reversed order. The ordering is advantageous if there is an IFFT stage following the FFT. The FFT module can take the radix reversed order into account when accessing the FFT results, or, if in order results are desirable, can implement a row reordering engine to reorder the rows.

To perform the final stage process shown in FIG. 3C, the FFT module proceeds from connector D 351 on FIG. 3B to Connector D 351 on FIG. 3C. The FFT module proceeds to block 362 and initializes a row address pointer. The row address pointer can be initialized to $p_{row}=c_n \cdot r$, where $c_n$ is initially set to zero and r is the FFT radix.

The FFT module then proceeds to process the final FFT stage in much the same way that previous FFT stages were processed. In block 364 the FFT module reads the rows from memory identified by an address row pointer that can be calculated as: $a_i = p_{row} + i$, $i=0 \ldots (r-1)$.

The FFT module proceeds to block 366 and computes the partial FFT for the values in the retrieved rows. The FFT engine computes r different r-point partial FFT on the retrieved rows.

The FFT module proceeds to block 368 and writes the partial FFT output values to the register bank. The FFT module proceeds to block 370 and writes the register block values to the sample memory rows that supplied the data to the FFT engine. The FFT module increments the counter cn in block 370.

The FFT module proceeds to decision block 372 and determines if all of the partial FFTs in the final block have been processed. If not, the FFT module returns to block 362 to continue processing rows of the sample memory. If all partial FFTs in the final stage have been processed, the FFT module proceeds from decision block 372 to optional row reordering block 374, where the FFT module performs row reordering. The FFT module then proceeds to block 399 and the N-point FFT is done.

As an alternative final FFT stage, the FFT module may instead perform the process shown in FIG. 3D. In the final FFT stage illustrated in the flowchart of FIG. 3D, the FFT module fetches the samples in the rows according to the same order used for the first stage of the FFT. The results is rows having samples in consecutive order, but with rows in a partial radix reversed order. Additionally, the partial radix reversed order only occurs when the number of FFT stages is greater than three. Despite the partial radix reversed row order, this final stage process may be advantageous because the samples in each row are consecutive.

To perform the final stage process of FIG. 3D, the FFT module proceeds from connector D 351 on FIG. 3B to connector D 351 on FIG. 3D. The FFT module proceeds to block 382 and sets the row address pointer using the same algorithm used for the initial stage of the FFT.

The FFT module proceeds to block 384 and reads the rows identified by the pointer and proceeds to block 386 and performs a partial FFT on the rows. The FFT module then proceeds to block 388 and writes the results of the partial FFT in the register bank. The FFT module then proceeds to block 390 and transposes the order of the values in the register bank.

The FFT module then proceeds to block 392 and writes the transposed values back to sample memory. The FFT module then proceeds to decision block 396 to determine if all partial FFTs in the final stage block have been calculated. If not, the FFT module proceeds back to block 382 and updates the pointer for the next partial FFT.

If, at decision block 396, the FFT module determines that all of the partial FFTs in the final stage have been calculated, the FFT module proceeds to block 398 and performs row reordering. As with the previous final stage embodiment shown in FIG. 3C, the row reordering step is optional. If no row reordering is performed, or after performing optional row reordering, the FFT module proceeds to block 399 and the FFT is done.

Figure 4:
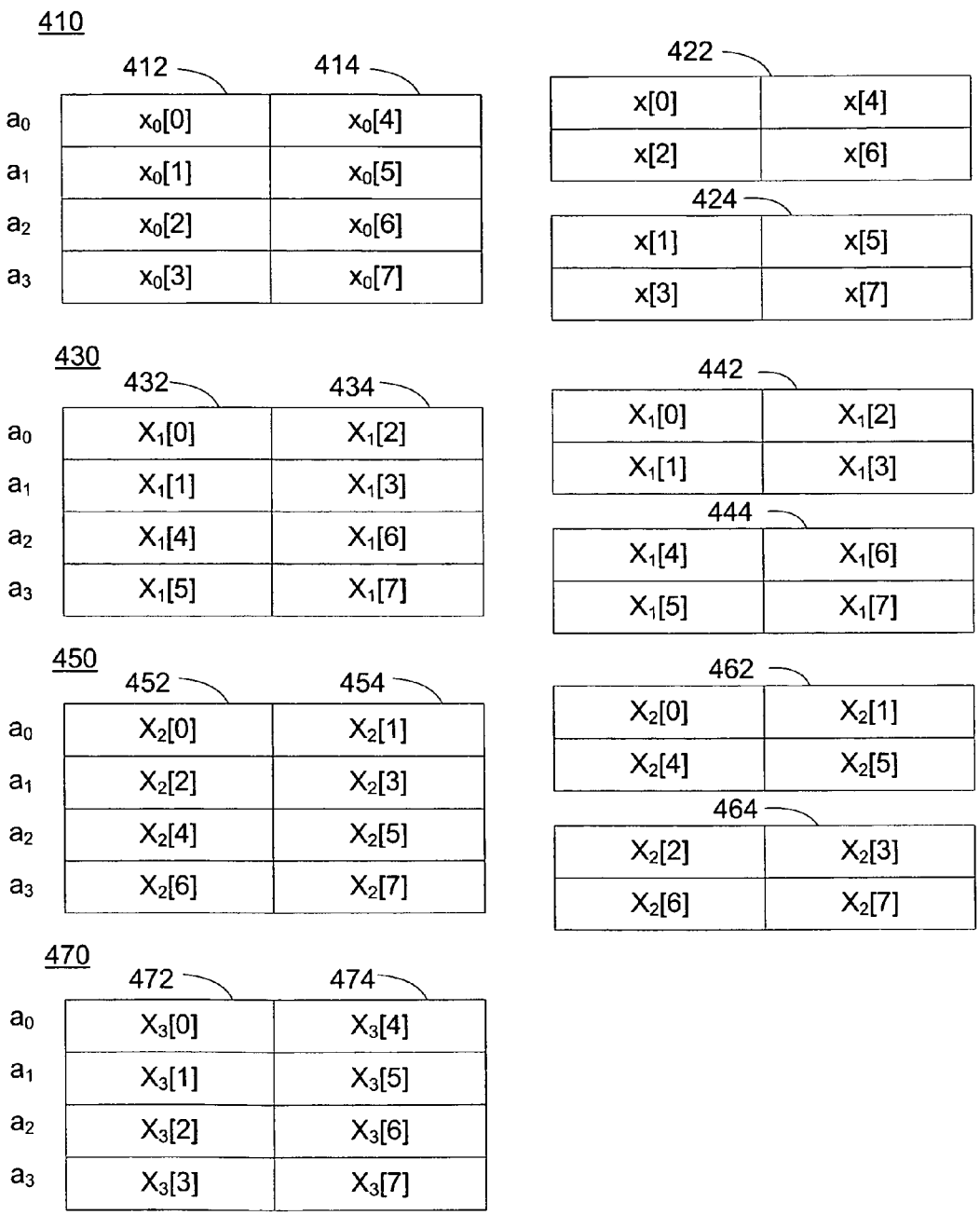
FIG. 4 is a functional block diagram of memory contents for stages of an embodiment of an 8 point radix 2 FFT.

FIG. 4 is a functional block diagram of the memory contents and register block contents for an 8-point radix 2 FFT embodiment performed according to the process of FIGS. 3A-3B. The 8-point FFT uses a sample memory of four rows and two columns. The register block is configured as an r×r matrix, which in this case is a 2×2 matrix.

The initial contents of the sample memory 410 are shown arranged in two columns, 412 and 414. The sample memory can be written in column order, writing values into a first column 412 until it is filled and then writing values into a second column 414. Each row of the sample memory 410 includes the correct sample values for performing the initial 2-point FFTs.

Rows a0 and a2 are initially retrieved from sample memory and FFTs performed on the values stored in the rows. The results are weighted with appropriate twiddle factors, and the results written into the register bank 422. The register bank values 422 are then transposed before being written back to sample memory. Similarly, rows a1 and a3 are retrieved from memory, processed in the FFT engine, weighted with appropriate twiddle factors, and written into the register bank 424. The register values in 424 over write the register previous register values 422 which have already been transposed and rewritten into sample memory. The new register block values 424 are transposed and rewritten into memory.

Sample memory 430 shows the contents after the completion of the first stage and first transposition. The data is still organized in two columns 432 and 434, but the values are adjusted based on the transposition to maintain the row relationship of the samples that are to be processed together.

Rows a0 and a1 are initially retrieved from sample memory and FFTs performed on the values stored in the rows. The results are weighted with appropriate twiddle factors, and the results written into the register bank 442. The register bank values 442 are then transposed before being written back to sample memory. Similarly, rows a2 and a3 are retrieved from memory, processed in the FFT engine, weighted with appropriate twiddle factors, and written into the register bank 444. The values are transposed and rewritten into sample memory.

Sample memory 450 shows the contents after the completion of the second stage and second transposition. From the third sample memory 450 arrangement, rows a0 and a1 are initially retrieved from sample memory and FFTs performed on the values stored in the rows. The results are weighted with appropriate twiddle factors, and the results written into the register bank 462. The register bank values 462 are then transposed before being written back to sample memory. Similarly, rows a2 and a3 are retrieved from memory, processed in the FFT engine, weighted with appropriate twiddle factors, and written into the register bank 464. The values are transposed and rewritten into sample memory. The transposed results written into the sample memory 470 represent the output of the 8-point FFT.

Figure 5A:
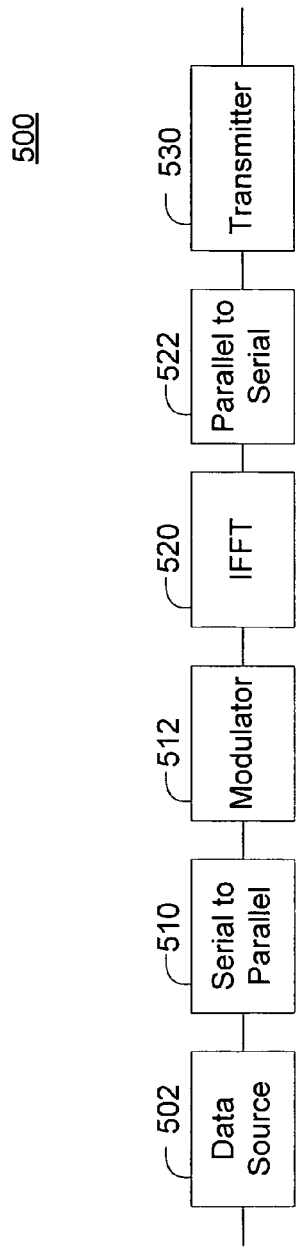
FIGS. 5A-5B are functional block diagrams of embodiments of OFDM system components using the FFT module disclosed herein.
Figure 5B:
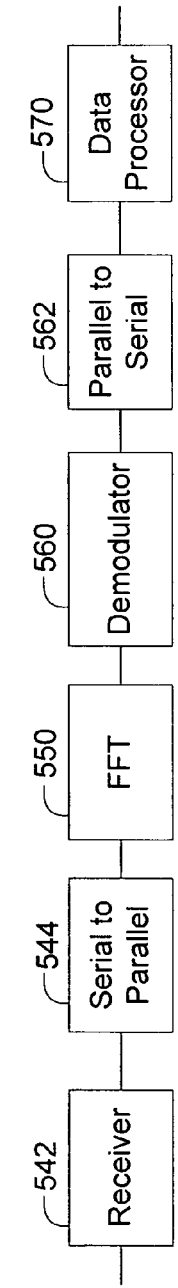

FIGS. 5A and 5B are functional block diagrams of OFDM system components that can incorporate the FFT module as described herein. An OFDM transmitter 500 and OFDM receiver 540 are discussed. Each of the OFDM transmitter 500 or receiver 540 can be implemented within a device or apparatus configured to communicate within an OFDM system. Such devices include, but are not limited to wireless telephones, such as cellular telephones, personal digital assistants, and the like, or some other communication device.

FIG. 5A is a functional block diagram of an OFDM transmitter 500 which may implement the FFT module of FIG. 2 and the FFT process of FIGS. 3A and 3B. Some or all of the blocks of the OFDM transmitter 500 of FIG. 5A may be implemented in a single IC or ASIC.

The OFDM transmitter 500 includes a data source 502 that typically includes some type of storage device configured to store data samples. The data samples may be generated external to the OFDM transmitter 500 or may be generated internal to the OFDM transmitter 500 using an Analog to Digital Converter (ADC) (not shown) coupled to a memory device.

A single data stream can be characterized as a serial data stream. A serial to parallel converter 510 is coupled to the data source 502 and forms parallel data streams for each orthogonal carrier in the OFDM transmitter 500. The output of the serial to parallel converter 510 is coupled to a modulator, where each of the parallel data streams can modulate a corresponding carrier of the OFDM carriers.

The multiple modulated OFDM carriers are then coupled to an IFFT module 520, which may be configured from the FFT module of FIG. 2, and which may use the process of FIGS. 3A and 3B. The IFFT module 520 transforms the orthogonal frequencies into a time domain OFDM symbol. The output of the IFFT module 520 is coupled to a parallel to serial converter 522 to convert the parallel output to a single serial symbol. The output of the parallel to serial converter 522 can be coupled to a transmitter 530, which may be a wireless transmitter.

FIG. 5B is a functional block diagram of an OFDM receiver 540 which is the complement to the OFDM transmitter 500 of FIG. 5A. As was the case with the OFDM transmitter 500, the OFDM receiver 540 may be implemented in a single IC or ASIC.

The OFDM receiver 540 includes a receiver 542 that can be configured as a wireless receiver that receives the OFDM symbols broadcast by a transmitter. The receiver 542 may be configured to amplify, filter, and downconvert the received signal to recover a baseband signal.

The baseband signal is coupled to a serial to parallel converter 544 that operates to convert the serial baseband data stream into parallel data streams for processing. The output of the serial to parallel converter 544 is coupled to an FFT module 550, which may be the FFT module of FIG. 2 performing the process of FIGS. 3A and 3B.

The FFT module 550 transforms the time domain symbol into the multiple orthogonal frequency components. The output of the FFT module 550 is coupled to a demodulator 560 that operates to demodulate the orthogonal frequencies to recover the data.

A parallel to serial converter 562 is coupled to the output of the FFT module 550 and converts the parallel data to a serial data stream. The serial data stream is coupled to a data processor for further processing. For example, voice data can be converted to an analog format for amplification and delivery to a speaker. Video data may be further processed and directed to a display device.

An FFT module implementing an FFT architecture can perform an in place transform in a reduced number of instructions compared to prior FFT implementations. The FFT module includes sample memory that arranges multiple values in a single row. The FFT operation is performed on the samples of a single row and written to a register block. One or more complex multipliers can be used to apply twiddle factors to the partial FFT results.

The weighted partial FFT results in the register bank are transposed and rewritten to the sample memory. The transposition maintains the relationship of FFT inputs for a single partial FFT in the same row of the sample memory. The process is repeated for multiple stages of the FFT until the desired FFT is complete.

The steps of a method, process, or algorithm described in connection with the embodiments disclosed herein may be embodied directly in hardware, in a software module executed by a processor, or in a combination of the two.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. Further, the various methods may be performed in the order shown in the embodiments or may be performed using a modified order of steps. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of determining an $r^n$-point, radix r, Fast Fourier Transform (FFT), the method comprising:
   writing samples to be transformed into a memory having r samples per row;
   reading r rows from the memory;
   determining r radix r partial FFTs to generate $r^2$ partial FFT values;
   applying twiddle factors to the $r^2$ partial FFT values to generate $r^2$ weighted partial FFT values;
   writing the $r^2$ weighted partial FFT values to a register block;
   transposing the $r^2$ weighted partial FFT values in the register block to generate transposed values;
   writing the transposed values to the memory; and
   using the transposed values to determine FFT values.

2. The method of claim 1, wherein writing samples into the memory comprises writing samples to be transformed column wise into a memory having $r^{n-1}$ rows and r columns.

3. The method of claim 1, wherein writing samples into the memory comprises writing complex samples to be transformed into the memory.

4. The method of claim 1, wherein reading r rows from the memory comprises:
   determining r row indices; and
   reading rows from the memory corresponding to the r row indices.

5. The method of claim 4, wherein determining r row indices comprises determining a row index corresponding to the formula $a_i = i \times r^{n-k-1}$, where k represents a stage of the FFT, for i=0 through (r−1).

6. The method of claim 1, wherein applying twiddle factors to the $r^2$ partial FFT values comprises:
   retrieving at least one complex twiddle factor; and
   calculating a complex multiplication of the at least one complex twiddle factor with a corresponding one of the $r^2$ partial FFT values.

7. The method of claim 1, wherein writing the $r^2$ weighted partial FFT values to the register block comprises writing the $r^2$ weighted partial FFT values to a register block configured as r rows and r columns.

8. The method of claim 7, wherein transposing the $r^2$ weighted partial FFT values comprises:
   retrieving a weighted partial FFT value corresponding to a row and column of the register bank;
   transposing the row and column indices; and
   writing the weighted partial FFT value to the row and column corresponding to the transposed indices.

9. A method of determining an $r^n$-point, radix r, Fast Fourier Transform (FFT), the method comprising:
   writing samples to be transformed into a memory having r samples per row;
   initializing a stage value;
   initializing a block value;
   processing an FFT stage, the processing comprising:
   a) determining a number of blocks based on the stage value;
   b) retrieving r rows from the memory;
   c) determining r radix r partial FFTs to generate $r^2$ partial FFT values;
   d) applying twiddle factors to the $r^2$ partial FFT values to generate $r^2$ weighted partial FFT values;
   e) transposing the $r^2$ weighted partial FFT values in the register block to generate transposed values;
   f) writing the transposed values to the memory; and
   g) repeating steps b) through f) based on the block and stage values;
   h) incrementing the stage value; and
   repeating processing the FFT stage n times; and
   determining FF1 values from the contents of memory.

10. A method of determining an $r^n$-point, radix r, Fast Fourier Transform (FFT), the method comprising:
   writing samples to be transformed into a memory having r samples per row;
   a) initializing a stage counter;
   b) initializing a block counter and a partial FFT counter;
   c) retrieving r rows from the memory based on the stage, block and partial FFT counter values;
   d) determining r radix r partial FFTs to generate $r^2$ partial FFT values;
   e) applying twiddle factors to the $r^2$ partial FFT values to generate $r^2$ weighted partial FFT values;
   f) writing the $r^2$ weighted partial FFT values to a register block;
   g) transposing the $r^2$ weighted partial FFT values in the register block to generate transposed values;
   i) writing the transposed values to the memory;
   j) updating the partial FFT counter and block counter;
   k) repeating steps c) through j) based on the value of the block counter and the partial FFT counter;
   l) updating the value of the stage counter;
   m) repeating steps b) through k) based on the value of the stage counter; and
   determining FFT values from the contents of memory.

11. An $r^n$-point, radix r, Fast Fourier Transform (FFT) apparatus; the apparatus comprising:
   a memory configured to store $r^n$ samples with r samples per memory row;
   an FFT engine configured to perform r r-point FFT partial FFT on samples from r rows of the memory;
   a register bank having $r^2$ registers configured as r rows of r columns, and configured to receive output values from the FFT engine; and
   a transposition module configured to transpose the values in the register bank and write transposed values to the r rows from memory operated on by the FFT engine.

12. The apparatus of claim 11, further comprising:
   a twiddle factor memory configured to store at least one FFT twiddle factor; and
   at least one multiplier configured to multiply a value from a register in the register bank by an FFT twiddle factor from the twiddle factor memory, and configured to write an output value to the register.

13. The apparatus of claim 12, wherein the at least one multiplier comprises at least one complex multiplier.

14. The apparatus of claim 12, wherein the at least one multiplier comprises r−1 complex multipliers.

15. The apparatus of claim 12, wherein the twiddle factor memory comprises at least one memory selected from the group comprising ROM, RAM, NV-RAM, and flash memory.

16. The apparatus of claim 11, wherein the $r^n$ samples comprise $r^n$ complex samples.

17. The apparatus of claim 11, wherein the memory comprises RAM.

18. The apparatus of claim 11, wherein the FFT engine comprises a pipelined FFT engine.

19. The apparatus of claim 11, wherein the transposition module transposes the values in the register bank by reading values in a column wise manner and writing the values to memory in a row wise manner.

20. The apparatus of claim 11, wherein the transposition module transposes the values in the register bank by reading a register value corresponding to a row value and a column value of the register bank, transposing the row value and the column value; and writing the register value to the register corresponding to the transposed row value and column value.

21. One or more storage devices configured to store one or more processor usable instructions, when executed by one or more processors, performing the method comprising:
   writing samples to be transformed into a memory having r samples per row;
   reading r rows from the memory;
   determining r radix r partial FFTs to generate $r^2$ partial FFT values;
   applying twiddle factors to the $r^2$ partial FFT values to generate $r^2$ weighted partial FFT values;
   writing the $r^2$ weighted partial FFT values to a register block;
   transposing the $r^2$ weighted partial FFT values in the register block to generate transposed values;
   writing the transposed values to the memory; and
   using the transposed values to determine FFT values.

22. An apparatus for determining an $r^n$-point, radix r, Fast Fourier Transform (FFT), the apparatus comprising:
- means for writing samples to be transformed into a memory having r samples per row;
- means for reading r rows from the memory;
- means for determining r radix r partial FFTs to generate $r^2$ partial FFT values;
- means for applying twiddle factors to the $r^2$ partial FFT values to generate $r^2$ weighted partial FFT values;
- means for writing the $r^2$ weighted partial FFT values to a register block;
- means for transposing the $r^2$ weighted partial FFT values in the register block to generate transposed values;
- means for writing the transposed values to the memory; and
- means for using the transposed values to determine FFT values.

23. The apparatus of claim 22, wherein the means for writing samples into the memory comprises writing samples to be transformed column wise into a memory having $r^{n-1}$ rows and r columns.

24. The apparatus of claim 22, wherein the means for writing samples into the memory comprises writing complex samples to be transformed into the memory.

25. The apparatus of claim 22, wherein the means for reading r rows from the memory comprises:
- means for determining r row indices; and
- means for reading rows from the memory corresponding to the r row indices.

26. The apparatus of claim 24, wherein the means for determining r row indices comprises determining a row index corresponding to the formula $a_i = i \times r^{n-k-1}$, where k represents a stage of the FFT, for i=0 through (r−1).

27. The apparatus of claim 22, wherein the means for applying twiddle factors to the $r^2$ partial FFT values comprises:
- means for retrieving at least one complex twiddle factor; and
- means for calculating a complex multiplication of the at least one complex twiddle factor with a corresponding one of the $r^2$ partial FFT values.

28. The apparatus of claim 22, wherein the means for writing the $r^2$ weighted partial FFT values to the register block comprises writing the $r^2$ weighted partial FFT values to a register block configured as r rows and r columns.

29. The apparatus of claim 28, wherein the means for transposing the $r^2$ weighted partial FFT values comprises:
- means for retrieving a weighted partial FFT value corresponding to a row and column of the register bank;
- means for transposing the row and column indices; and
- means for writing the weighted partial FFT value to the row and column corresponding to the transposed indices.

30. An apparatus for determining an $r^n$-point, radix r, Fast Fourier Transform (FFT), the apparatus comprising:
- means for writing samples to be transformed into a memory having r samples per row;
- means for processing a plurality of FFT stages, the processing including a plurality of operations, said operations comprising:
  a) initializing a block value;
  b) retrieving r rows from the memory;
  c) determining r radix r partial FFTs to generate $r^2$ partial FFT values;
  d) applying twiddle factors to the $r^2$ partial FFT values to generate $r^2$ weighted partial FFT values;
  e) transposing the $r^2$ weighted partial FFT values in the register block to generate transposed values;
  f) writing the transposed values to the memory;
  g) updating the block value;
  h) repeating operations b) through g) based on the block value; and
  i) repeating operations a) through h) n times; and
- means for determining FFT values from the contents of memory.

31. An apparatus to determine an $r^n$-point, radix r, Fast Fourier Transform (FFT), the apparatus comprising:
- means for writing samples to be transformed into a memory having r samples per row;
- means for initializing a stage counter;
- means for processing a plurality of FFT stages, the processing including a plurality of operations, said operations comprising:
  a) initializing a block counter and a partial FFT counter;
  b) retrieving r rows from the memory based on the stage, block and partial FFT counter values;
  c) determining r radix r partial FFTs to generate $r^2$ partial FFT values;
  d) applying twiddle factors to the $r^2$ partial FFT values to generate $r^2$ weighted partial FFT values;
  e) writing the $r^2$ weighted partial FFT values to a register block;
  f) transposing the $r^2$ weighted partial FFT values in the register block to generate transposed values;
  g) writing the transposed values to the memory;
  h) updating the partial FFT counter and block counter;
  i) repeating operations b) through h) based on the value of the block counter and the partial FFT counter;
  j) updating the value of the stage counter; and
  k) repeating operations a) through j) based on the value of the stage counter; and
- means for determining FFT values from the contents of memory.

* * * * *